No. 671,856. Patented Apr. 9, 1901.
J. W. DARLEY, Jr.
TRUCK FOR AUTOCARETTES.
(Application filed Sept. 4, 1900.)

(No Model.) 3 Sheets—Sheet 1.

No. 671,856. Patented Apr. 9, 1901.
J. W. DARLEY, Jr.
TRUCK FOR AUTOCARETTES.
(Application filed Sept. 4, 1900.)
(No Model.) 3 Sheets—Sheet 2.

No. 671,856. Patented Apr. 9, 1901.
J. W. DARLEY, Jr.
TRUCK FOR AUTOCARETTES.
(Application filed Sept. 4, 1900.)
(No Model.) 3 Sheets—Sheet 3.
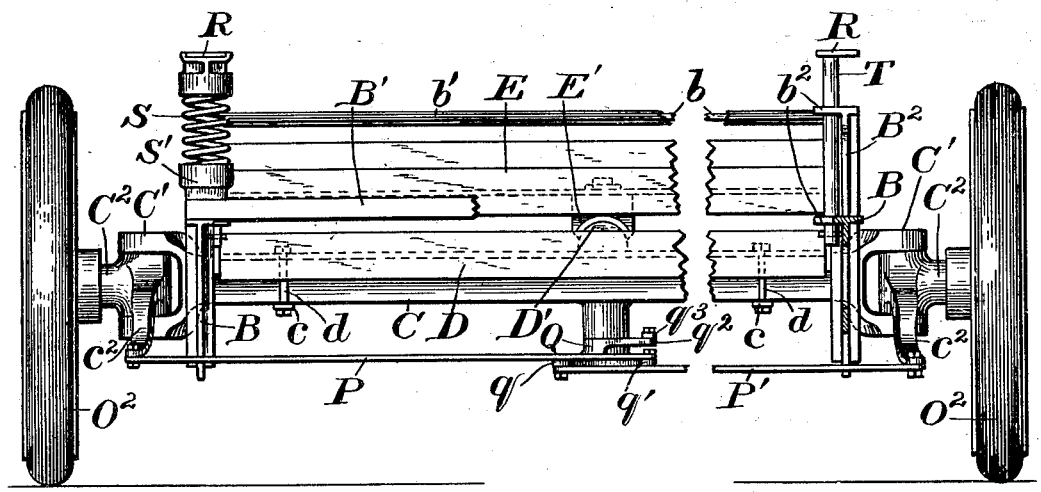
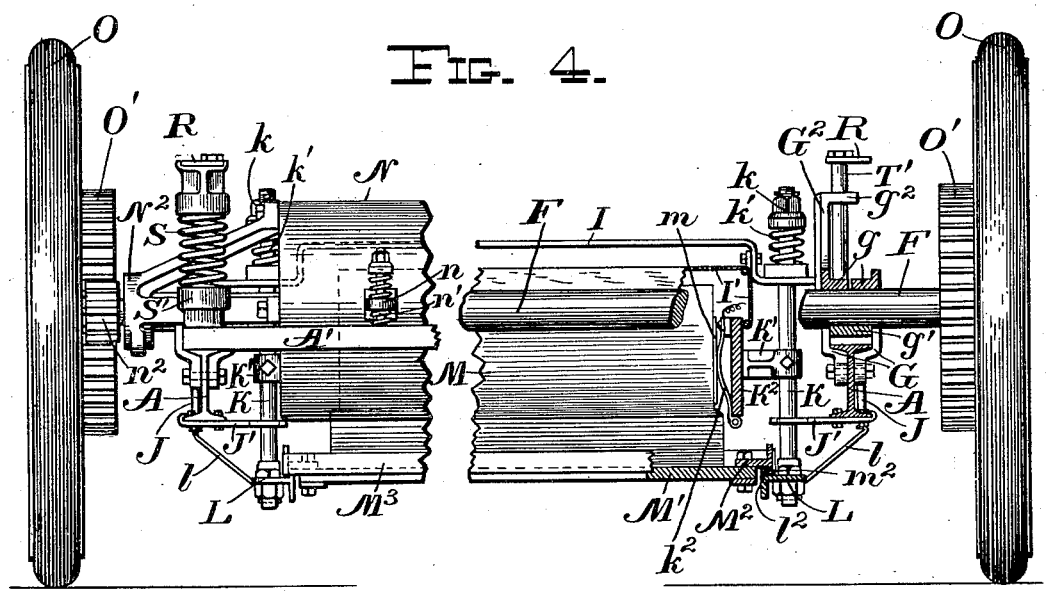

UNITED STATES PATENT OFFICE.

JOHN W. DARLEY, JR., OF BALTIMORE, MARYLAND.

TRUCK FOR AUTOCARETTES.

SPECIFICATION forming part of Letters Patent No. 671,856, dated April 9, 1901.

Application filed September 4, 1900. Serial No. 28,939. (No model.)

*To all whom it may concern:*

Be it known that I, JOHN W. DARLEY, Jr., a citizen of the United States, residing at Baltimore city, in the State of Maryland, have invented certain new and useful Improvements in Trucks for Autocarettes; and I do hereby declare the following to be a full, clear, and exact description of the invention, such as will enable others skilled in the art to which it appertains to make and use the same.

My invention relates to improvements in trucks for automobiles, and particularly for that class of vehicles known as "autocarettes;" and it consists of a truck so constructed as to carry a storage battery and motor, together with suitable connections and steering apparatus.

One object of the invention is to provide means whereby the storage battery may be hung in the truck so as to receive the smallest amount of vibration and so that all shocks and jars will be reduced to the minimum.

Another object of the invention is to provide means whereby the storage battery may be readily disengaged from the truck for the removal thereof and another battery may be as readily fixed in position.

These and other objects, which will appear hereinafter, I attain by constructing and arranging the truck in the manner to be hereinafter described.

Reference is had to the accompanying drawings, in which the same parts are designated by the same letters of reference throughout the several views, and in which—

Figure 1:
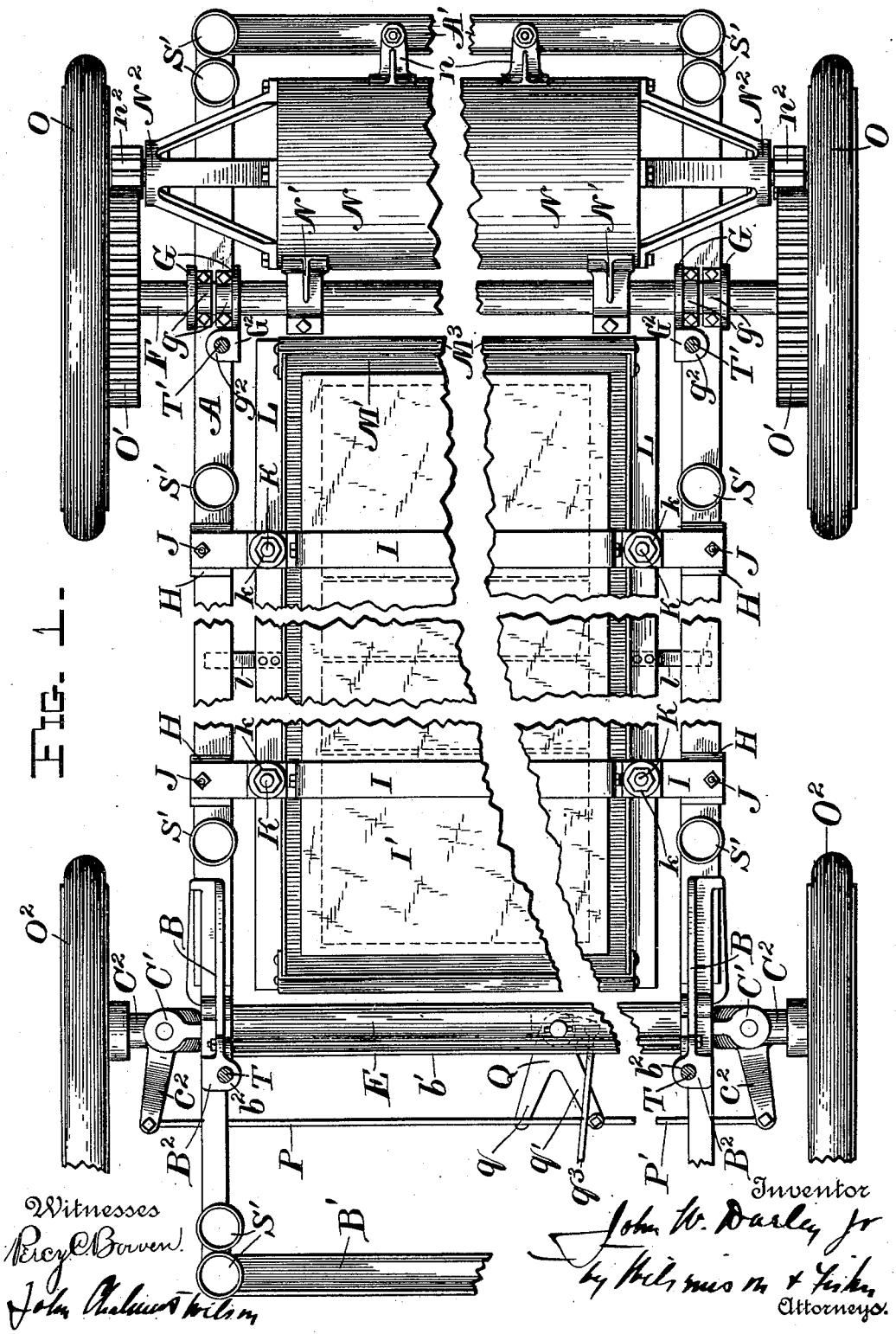
Figure 2:
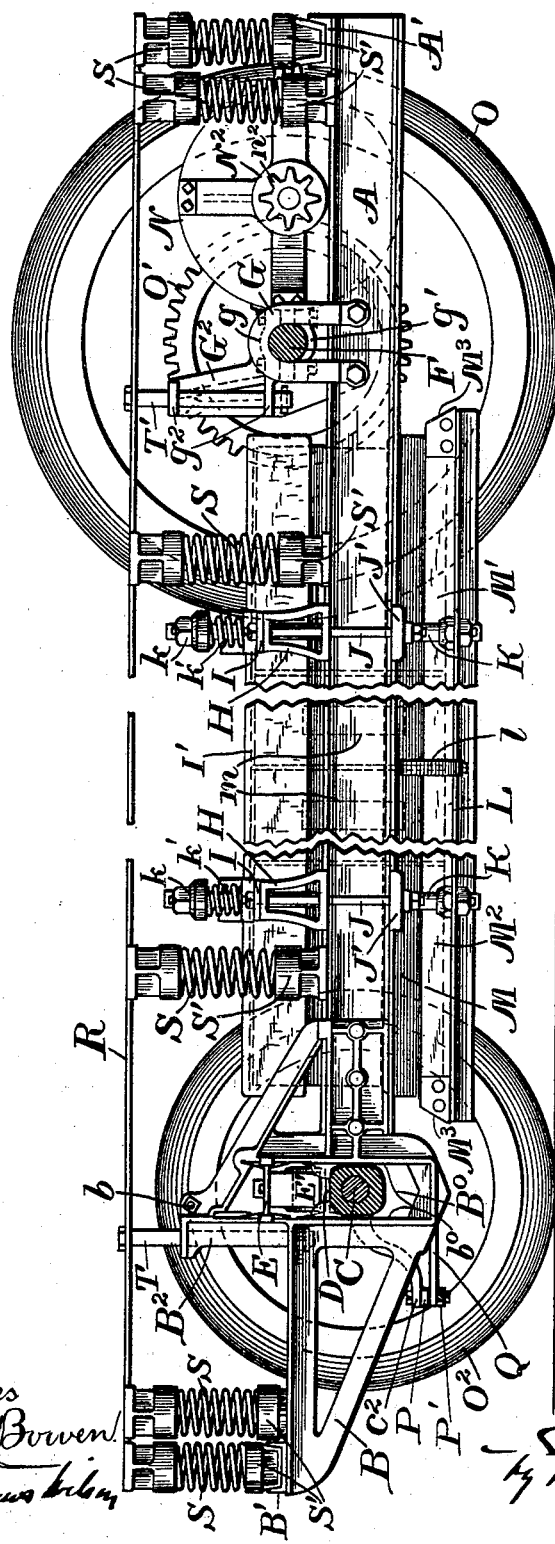

Figure 1 represents a plan of my improved truck with the car-body and parts attached directly thereto removed. Fig. 2 represents a side elevation of the same with the wheels on the near side removed. Fig. 3 represents a front elevation of the same, a part of the frame on the right-hand side being broken away. Fig. 4 represents a rear elevation with the right-hand side broken away and partly in section.

The framing of the truck consists of two I-beams A A, placed longitudinally along its sides and connected together at their rear ends by a transverse channel-iron A'. The front ends of the I-beams A are secured to the frames B, which are connected together at their front ends by a channel-iron B'. The frames B are each formed as shown in Fig. 2, having a vertical opening $B^0$ therethrough, the parallel sides $b^0$ of which form guideways for the ends of the front axle C, which passes through the said openings $B^0$ and has a limited vertical play therein. A transverse I-beam D rests upon and is secured to the axle C in any suitable manner, as by bolts $d$ and clips $c$, thus forming part of the axle. A short distance above the I-beam D is a similar beam E, arranged parallel with the beam D and secured at its ends to the frames B. On top of the I-beam D, at the middle thereof, is fixed a segmental piece D', and to the I-beam E is fixed a concave piece E', which is fitted to receive and rest upon the piece D', thus forming a flexible bearing upon the center of the axle, which will allow one end of the axle to rise in passing over an obstruction, (the ends of the axle being free to rise and fall in the openings $B^0$,) thus decreasing the shock. A brace-rod $b$ extends across the frame above the I-beam E, the said rod passing through a sleeve $b'$, which is placed between the frames B B and serves to keep the said frames at the proper distance apart. The rod passing through the frames B B is held firmly by nuts screwed upon its ends against the outside of the said frames.

The rear axle F extends across the rear portion of the truck-frame above the I-beams A A, to which it is secured by inverted-U-shaped hangers G, one being placed on each side of each I-beam A A and secured thereto by bolts or other suitable means. The hangers G are provided with flanges $g$, which rest upon the axle F and are bolted down to straps $g'$, placed beneath the axle, thus binding the axle and hangers firmly together.

Upon the I-beams A A are mounted a suitable number of pillow-blocks H, which support the ends of cross-bars I, which in turn support the curtain I', which serves as a cover for the battery. Bolts J pass through the ends of the bars I, through the pillow-blocks H H, the flanges of the I-beams A A, and through horizontal pieces J' J' beneath the beams A A. Bolts K K pass loosely through holes in the cross-bars I and the pieces J' J' and are firmly secured at their lower ends to T-irons L L, which latter extend parallel with the beams A A and support the battery-tray M'. Upon the tops of the bolts K are secured nuts $k$, which rest upon the springs $k'$, which form cushions to support the battery.

The battery M rests upon the tray M' and may be of any suitable form and is provided at its sides with contact-plates $m$, which are suitably connected with the proper poles of the battery; but as the particular form of battery and the manner of connecting the contact-plates $m$ therewith forms no part of the present invention it is not shown in detail.

Secured to the bolts K by any suitable means, such as brackets K', is a board $K^2$, which extends along the sides of the battery and has connected therewith contact-springs $k^2$, arranged to make contact with the contact-plates $m$ on the battery. The board $K^2$ and the battery-tray M' are all carried by the bolts K, so that the battery-tray, battery, and contacts all ride upon the springs $k'$ and all move together. The battery-tray M' is secured to a framework consisting of longitudinal T-irons $M^2$ and transverse pieces $M^3$, the depending flanges $m^2$ of the T-irons $M^2$ extending over the flanges $l^2$ on the T-irons L and resting upon the latter, thus forming a secure resting-place for the battery-tray.

A hook $l$ is secured to each of the T-irons L, and when it is desired to remove the battery from the truck the latter is run over a suitable lifting device or elevator, (not shown,) which lifts the battery-tray above the flanges $l^2$ on the T-irons L. The latter are then drawn outwardly from the center and from under the T-irons $M^2$, the pieces J' being slotted to allow the bolts K to move outwardly. The hooks $l$ are then hooked over the lower flanges of the beams A A, which will hold the T-irons L apart, thus allowing the battery-tray to be lowered and moved out of the truck and another battery and tray to be raised in the place of the one removed. The hooks $l$ are then unhooked and the T-irons L L allowed to move back beneath the T-irons $M^2$ on the battery-tray M', and the latter is then lowered in place upon the T-irons L L, as will be readily understood. In removing and replacing the battery the contact-plates $m$ will slide out of and into contact with the contact-springs $k^2$.

The motors N N are hung upon the rear axle by the brackets N' and are supported at their rear sides by arms $n\ n$, which rest upon springs $n'\ n'$ upon the rear channel-iron A'. The armature-shafts are supported at their outer ends in bearings $N^2$, secured to the motors, and extend nearly to the rear driving-wheels O, where they are provided at their ends with pinions $n^3$, which mesh with gear-wheels O' on the driving-wheels O. Thus motion is transmitted from the armature-shaft to the driving-wheels O to propel the vehicle.

The front axle C extends through the openings $B^0$ in the frames B and is provided at its ends with clevises C', in which are held and pivoted the short axles $C^2$, which carry the front or steering wheels $O^2$. The short axles $C^2$ are provided with arms $c^2$, which extend forwardly and downwardly and have pivoted to their forward ends the rods P P', which form part of the steering-gear. Pivoted below the center of the front axle C is a three-arm bell-crank lever Q, having two forwardly-projecting arms $q\ q'$ and a laterally-projecting arm $q^2$. The rods P P' are pivoted to the arms $q\ q'$, which arms are made of such length and are set at such an angle as will cause the steering-wheels $O^2$ to turn in the proper relation to cause the vehicle to turn a curve smoothly and without slipping of the wheels. The arm $q^2$ of the bell-crank lever Q is connected by a rod $q^3$ with any suitable steering mechanism or handle, (not shown,) by means of which the vehicle may be steered.

Longitudinal strips R are supported upon springs S, which rest in sockets S' upon the I-beams A A, and to these strips R the body of the vehicle is secured.

T T' designate bolts secured to the strips R and extending downwardly in bearings upon the truck-frame. The forward bolts T have guide-bearings $b^2$ in upward extensions $B^2$ of the frames B, and the rearward bolts T' have guide-bearings $g^2$ in upward extensions $G^2$ on the inner U-shaped pieces G. These bolts T T', while allowing the body of the vehicle to move freely up and down as the springs S expand or are compressed, will prevent sidewise or longitudinal movement of the body of the vehicle upon the truck.

The operation of the device will be clearly understood from the foregoing without further description.

Having thus described my invention, what I claim as new, and desire to secure by Letters Patent of the United States, is—

1. In a truck of the character described, the combination with a frame having guideways therein; of an axle extending through the said guideways, a segmental piece on the said axle, and a concave piece on said frame to receive said segmental piece, substantially as described.

2. In a truck of the character described, the combination with a frame having guideways therein; of an axle extending through the said guideways, clevises on the ends of said axle, short axles pivoted in the said clevises, wheels mounted on said short axles, a segmental piece on the axle, a concave piece on the frame to receive and rest on said segmental piece, and means for turning said short axles on their pivots, substantially as described.

3. In a truck of the character described, the combination with a frame having side beams; of supports upon said side beams, bars resting upon said supports, springs upon said bars, bolts supported by said springs, and a battery-tray supported by said bolts, substantially as described.

4. In a truck of the character described, the combination with a frame; of bolts supported on springs on said frame, bars secured to said bolts, a battery-tray resting upon said bars, and means for holding said bars apart while the battery-tray is being removed, substantially as described.

5. In a truck of the character described, the combination with a frame; of bolts supported on springs on said frame, bars secured to said bolts, a battery-tray resting upon said bars, a battery on said tray, contact-plates on said battery, and contact devices carried by the said bolts adapted to make contact with said contact-plates, substantially as described.

6. In a truck of the character described, the combination with a frame; of bolts supported on springs on said frame, bars secured to said bolts, a battery-tray resting upon said bars, a battery on said tray, contact-plates on said battery, contact devices carried by the said bolts adapted to make contact with said contact-plates, and means for holding said bars apart while the battery-tray is being removed, substantially as described.

7. In a truck of the character described, the combination with a frame, of cross-bars supported upon said frame, bolts supported upon springs upon said cross-bars, longitudinal bars secured to said bolts, a battery supported by said longitudinal bars, and a cover for said battery supported by said cross-bars, substantially as described.

8. In a truck of the character described the combination with a frame, an axle mounted in said frame, a segmental piece on said axle, a concave piece on said frame to receive said segmental piece, guideways in the frame for the ends of said axle, short axles pivoted to the ends of said axle, and arms projecting forwardly from said short axles; of a three-arm lever pivoted to said axle, a connecting-rod connecting the arm on the short axle on the right-hand side with the left-hand arm of the lever, a connecting-rod connecting the arm on the short axle on the left-hand side with the right-hand arm of the lever, and means for turning the said lever to turn the short axles, substantially as described.

In testimony whereof I affix my signature in presence of two witnesses.

J. W. DARLEY, JR.

Witnesses:
 J. STEWART SMITH,
 FRED. W. FOLLMER.